(12) United States Patent
Jamart et al.

(10) Patent No.: US 12,017,949 B2
(45) Date of Patent: Jun. 25, 2024

(54) PROCESS FOR OBTAINING A MATERIAL COMPRISING A GLASS SHEET

(71) Applicant: SAINT-GOBAIN GLASS FRANCE, Courbevoie (FR)

(72) Inventors: Juliette Jamart, Compiegne (FR); Charline Lalande, Compiegne (FR); Marion Lallement, Margny les Compiegne (FR); Willy Queval, Elincourt Sainte Marguerite (FR); Leila Dumotier, Margny les Compiegne (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 320 days.

(21) Appl. No.: 17/280,629

(22) PCT Filed: Sep. 26, 2019

(86) PCT No.: PCT/EP2019/076056
§ 371 (c)(1),
(2) Date: Mar. 26, 2021

(87) PCT Pub. No.: WO2020/064940
PCT Pub. Date: Apr. 2, 2020

(65) Prior Publication Data
US 2021/0340060 A1 Nov. 4, 2021

(30) Foreign Application Priority Data
Sep. 27, 2018 (FR) ...................... 1858861

(51) Int. Cl.
*C03C 17/36* (2006.01)
*C03C 17/10* (2006.01)
(52) U.S. Cl.
CPC .......... *C03C 17/3605* (2013.01); *C03C 17/10* (2013.01); *C03C 17/3642* (2013.01);
(Continued)

(58) Field of Classification Search
CPC .............. C03C 2218/355; C03C 17/44; C03C 17/3417; C03C 2204/04; C03C 17/366
See application file for complete search history.

(56) References Cited

U.S. PATENT DOCUMENTS 2,406,939 A * 9/1946 Boicey ................. B64C 1/1492
52/204.62
6,682,773 B2 * 1/2004 Medwick ............. B65G 49/069
427/407.1

(Continued)

FOREIGN PATENT DOCUMENTS

EP       2 314 553 A1    4/2011
EP       3 034 296 A1    6/2016
WO   WO 2015/185848 A1  12/2015

OTHER PUBLICATIONS

Partial screengrab of https://www.pressglass.com/market-offer/special-glass/silk-screen-printing/, no date.*

(Continued)

*Primary Examiner* — Alex A Rolland
(74) *Attorney, Agent, or Firm* — Pillsbury Winthrop Shaw Pittman LLP

(57) ABSTRACT

A process for obtaining a material including a glass sheet, includes providing a glass sheet including a first face coated at least partly by an essentially mineral first coating, the face having at least one first zone and at least one second zone, the at least one first zone having a higher emissivity than that of the second zone, then applying, on at least one portion of the second zone, a sacrificial layer including a resin, then heat treating the coated glass sheet at a temperature of at least 550° C., during which step the sacrificial layer is removed by combustion.

18 Claims, 2 Drawing Sheets

(52) U.S. Cl.
CPC ...... *C03C 17/3644* (2013.01); *C03C 17/3655* (2013.01); *C03C 17/366* (2013.01); C03C 2204/04 (2013.01); C03C 2217/256 (2013.01); C03C 2217/485 (2013.01); C03C 2217/94 (2013.01); C03C 2218/119 (2013.01); C03C 2218/328 (2013.01); C03C 2218/34 (2013.01)

(56) References Cited

U.S. PATENT DOCUMENTS

2012/0308811 A1    12/2012  Roquiny et al.
2017/0088460 A1*   3/2017   Maillet ................. C23C 14/083

OTHER PUBLICATIONS

International Search Report as issued in International Patent Application No. PCT/EP2019/076056, dated Dec. 2, 2019.

* cited by examiner

PROCESS FOR OBTAINING A MATERIAL COMPRISING A GLASS SHEET

CROSS-REFERENCE TO RELATED APPLICATIONS

This application is the U.S. National Stage of PCT/EP2019/076056, filed Sep. 26, 2019, which in turn claims priority to French patent application number 1858861 filed Sep. 27, 2018. The content of these applications are incorporated herein by reference in their entireties.

The invention relates to the field of materials comprising a glass sheet, in particular glazings. It relates more particularly to a process that uses a high-temperature heat treatment, for example a bending and/or tempering treatment and that makes it possible to obtain products of better quality in terms of optical properties.

The glass sheets used in the manufacture of glazings for buildings or transport vehicles are frequently functionalized by the addition of coatings, in particular mineral coatings. They may for example be coatings intended to improve the thermal properties of the final glazing, for example low-emissivity electrically-conductive coatings, which will improve the thermal insulation by reflecting infrared radiation and preventing heat losses from the building or the vehicle, or else solar-control coatings, which will absorb and/or reflect a portion of the solar radiation and thus prevent heat buildup inside the building or vehicle. They may also be coatings that have an esthetic function, such as enamel coatings, which make it possible for example to conceal assembly seals of the glazing in a bodywork opening of a vehicle and also to protect them against ultraviolet radiation. They may also be coatings that have an electrical conduction function, for example coatings in the form of wires serving to heat, via the Joule effect, rear windows of motor vehicles.

The manufacture of glazings frequently uses heat treatment at high temperature, above 550° C., in particular bending and/or tempering treatments, intended to mechanically strengthen the glazing or to give it the desired shape. These treatments are carried out in heating devices such as furnaces, in which the glass sheets are heated by convection and radiation.

The inventors have been able to demonstrate that optical defects could appear under certain conditions, when the glass sheets are coated in a different manner depending on the zones. The inventors were able to observe that these optical defects originated from the fact that the temperatures experienced by the glass sheet in the different zones could differ by several tens of degrees. The zones covered by a low-emissivity coating, which reflect infrared radiation, have a tendency to heat up less than the zones of greater emissivity, and the difference may also be aggravated by the presence, in certain zones of the glazing, of coatings that absorb infrared radiation, for example opaque enamel coatings. The superposed presence, in certain zones, of coatings that reflect infrared radiation and of coatings that absorb infrared radiation has also proved problematic. Likewise, the zones covered by a coating that absorbs infrared radiation, for example opaque enamel coatings, have a tendency to be subjected to higher temperatures than the uncoated zones.

The objective of the invention is to remove these drawbacks. For this purpose, one subject of the invention is a process for obtaining a material comprising a glass sheet, said process comprising the following steps:

providing a glass sheet comprising a first face coated at least partly by an essentially mineral first coating, said first face having at least one first zone and at least one second zone, said at least one first zone having a higher emissivity than that of said second zone, then applying, on at least one portion of said second zone, a sacrificial layer comprising a resin, then heat treating said coated glass sheet at a temperature of at least 550° C., during which step said sacrificial layer is removed by combustion.

Figure 1:
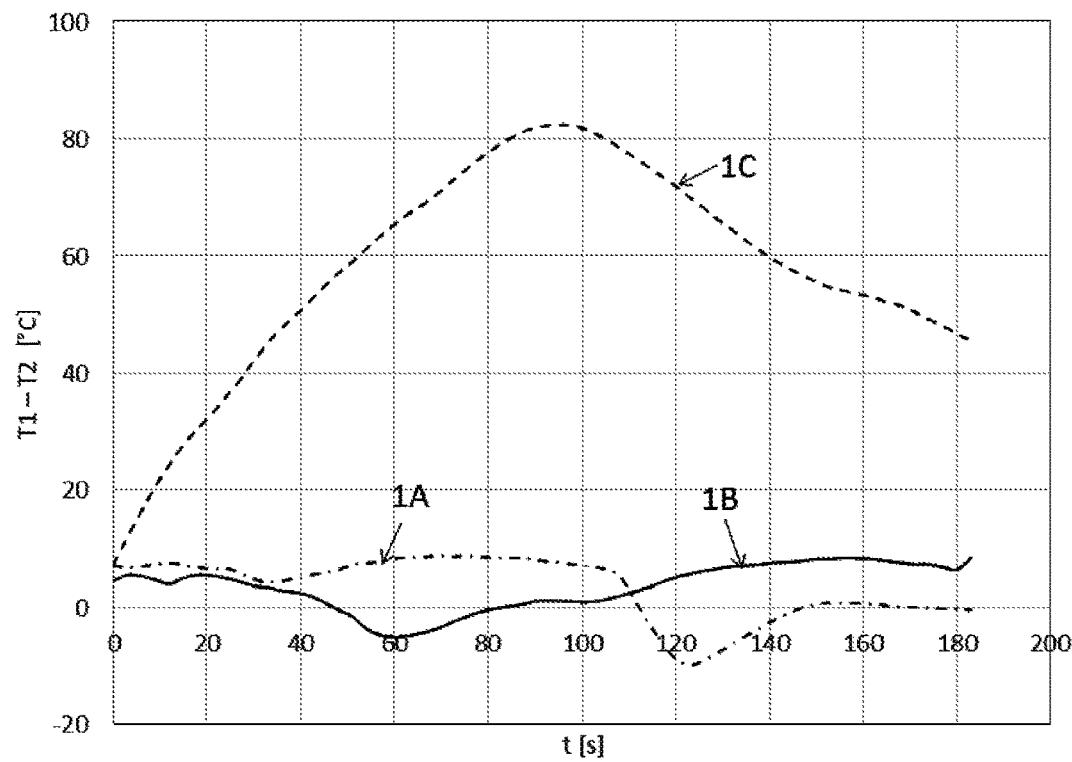
FIG. 1 shows a graph that represents variations of the temperature difference T1-T2 as a function of the heating time (t, expressed in seconds) between a first zone having a higher emissivity than that of a second zone of different glass substrates according to an embodiment.

The glass sheet is preferably flat before the heat treatment step. The glass is typically a soda-lime-silica glass, but other glasses, for example borosilicates or aluminosilicates may also be used. The glass sheet is preferably obtained by the float process, i.e. by a process consisting in pouring molten glass onto a bath of molten tin.

The glass sheet may be clear or tinted, for example green, blue, grey or bronze. The choice is made as a function of the use of the final glazing. In the case for example of a motor vehicle rear window, the light transmission of the glass is preferably at least 30%; the glass sheet then preferably comprises a content of iron oxide (expressed in the form $Fe_2O_3$) of between 0.5% and 1.2% by weight. In the case of a motor vehicle windshield, the light transmission of the glazing is normally at least 70%; the glass sheet then preferably comprises a content of iron oxide of between 0.1% and 0.9% by weight.

The glass sheet preferably has a thickness within a range of from 0.7 to 19 mm, in particular from 1 to 10 mm, particularly from 2 to 6 mm, or even from 2 to 4 mm. The glass sheet preferably has a surface area of at least 1 m².

The expression "essentially mineral" is understood to mean that the coating comprises at least 50% by weight of mineral compounds, preferably at least 60%, in particular 70%, or even 80%. According to one embodiment, the coating may be completely mineral, optionally with the exception of possible organic impurities. According to another embodiment, the coating comprises organic compounds, for example solvents or a medium, which will be removed at the latest during the heat treatment step, optionally before the latter, for example during a drying or pre-firing step.

First Aspect of the Invention

According to a first aspect of the invention, the first coating is electrically conductive. This type of coating intrinsically has a low emissivity likely to disrupt the heating process during the heat treatment step.

The first coating preferably comprises at least one metal, in particular silver, or comprises at least one transparent conductive oxide.

In a first preferred embodiment of the first aspect of the invention, the first coating is transparent and preferably covers at least 80%, or even 90%, of the surface area of the glass sheet. This type of coating in particular has the role of improving the thermal insulation of the glazing.

The first coating then preferably comprises at least one layer of a transparent conductive oxide (TCO). The transparent conductive oxide is preferably chosen from the mixed indium tin oxide (ITO), doped tin oxides, in particular fluorine- or antimony-doped tin oxides, doped zinc oxides, in particular aluminum- or gallium-doped zinc oxides. These oxides are both transparent and electrically conductive, therefore having a low emissivity. The or each layer of transparent conductive oxide is preferably flanked by dielectric layers, in particular based on oxides, nitrides and/or oxynitrides, in particular of silicon, tin, zinc or titanium. The total physical thickness of transparent conductive oxide is preferably between 30 and 200 nm, in particular between 40 and 150 nm.

Alternatively, the first coating may comprise at least one thin layer of silver, the or each thin layer of silver being flanked by dielectric layers.

In the context of this embodiment, the first coating is preferably deposited by sputtering, in particular magnetron sputtering, or by chemical vapor deposition (CVD).

In a second preferred embodiment of the first aspect of the invention, the first coating is opaque and preferably covers at most 20%, in particular between 1% and 10%, or even between 1% and 5% of the surface area of the glass sheet. The first coating is preferably in the form of electrically conductive tracks, and serves in particular as heating wire or antenna wire, for example on a motor vehicle rear window.

The first coating in this case preferably comprises silver paste tracks, in particular consists of silver paste tracks. The tracks are generally positioned in the form of wires passing through the glass sheet and of wider bus bars located on the edges of the glass sheet.

In the context of this second embodiment, the first coating is preferably deposited by screenprinting of a fluid composition comprising metal particles, in particular silver particles, a glass frit and an organic medium. The latter is removed during the heat treatment step of the process, which makes it possible to consolidate the coating. After this firing treatment, the coating obtained essentially consists of silver particles bound by a vitreous binder.

The silver paste preferably comprises, in the wet state, between 65% and 75% by weight of silver. The thickness of the coating based on silver paste is preferably between 20 and 100 µm in the wet state, or between 10 and 50 µm after firing.

In the context of the first aspect of the invention, the first face of the glass sheet is preferably coated over at least one portion by an essentially mineral second coating.

The second coating is advantageously an enamel containing pigments, in particular black pigments. The second coating is preferably opaque.

The simultaneous presence on the same face of the glass sheet of such a coating and of a first coating as described above aggravates the aforementioned problems. The enamel, in particular opaque enamel, and in particular when it is black, specifically greatly absorbs infrared radiation, whereas the first coating, when it is electrically conductive, reflects it. This results in great temperature differences between, on the one hand, the zones coated by the first coating and, on the other hand, the zones coated by the second coating, or even where necessary the zones covered both by the first and the second coating, or else the zones which are not covered by either of the first and second coatings.

The enamel coating is preferably deposited by screenprinting of a fluid enamel composition comprising a glass frit, pigments and an organic medium. The latter is removed during the heat treatment step of the process, which makes it possible to consolidate the enamel coating. After firing, the enamel coating therefore comprises pigments in a glassy matrix.

The glass frit or the glassy matrix is preferably based on a bismuth and/or zinc borosilicate. The pigments preferably comprise one or more oxides selected from the oxides of chromium, copper, iron, manganese, cobalt, nickel. They may be, by way of example, chromates of copper and/or iron. The thickness of the enamel coating, after the heat treatment step, is preferably within a range of from 5 to 50 µm, in particular from 10 to 40 µm.

Preferably, one of the first and second coatings partially covers the other. Several variants are described below.

According to a first variant, the first coating is electrically conductive and covers a portion of the second coating which is an enamel containing pigments. Preferably, the first coating comprises silver paste tracks (in particular according to the "second embodiment" described above). The preferred features mentioned previously for these coatings are obviously applicable here. The coated face then has a first zone, which is the enameled zone not coated by the silver paste tracks, this first zone having a higher emissivity than that of a second zone, which is the zone coated by the silver paste tracks.

In this variant, it was able to be observed that in the zones where the enamel is covered by the silver paste, the presence of the latter greatly reduces the efficacy of the firing of the enamel, so that the latter has a grayish tint after firing. A mechanical weakening was also observed, leading in certain cases to breakage of the glass sheet during the cooling which follows the heat treatment, or even after the operations for welding electrical connectors to the silver paste.

The material obtained in this variant is preferably integrated into a motor vehicle rear window, the first coating being silver paste tracks comprising heating wires passing through the glass sheet and bus bars located on two opposite sides of the glass sheet, the bus bars being deposited on an enamel coating (in particular black enamel coating) positioned at the periphery of the glass sheet. The first face of the glass sheet is intended here, in the usage position, to be in contact with the inside of the vehicle and the presence of enamel makes it possible in particular to conceal the bus bars from the outside of the vehicle. The heat treatment is here preferably a bending treatment, in particular a bending-tempering treatment. In certain cases, the curved glass sheet is laminated to a second glass sheet, so that the first face, coated with silver paste tracks, is in contact with the inside of the vehicle (face 4).

According to a second variant, the second coating is an enamel containing pigments and partially covers the first coating which is electrically conductive. The first coating preferably comprises at least one transparent conductive oxide (in particular in accordance with the "first embodiment" described previously). The preferred features mentioned previously for these coatings are obviously applicable here. The coated face then has a first zone, which is the enameled zone, this first zone having a higher emissivity than that of a second zone, which is the zone coated solely by the electrically conductive coating.

The material obtained in this variant is preferably integrated into a motor vehicle roof or a motor vehicle roof panel, the enamel preferably being a black enamel, positioned at the periphery of the first face of the glass sheet, and deposited on an electrically conductive coating, comprising a transparent conductive oxide, positioned over the whole of said first face. In the zones coated solely by the first coating, the efficacy of the heating is reduced by the low-emissivity nature of the first coating, whereas in the zones where the first coating is covered by the enamel, the absorption of infrared radiation by the enamel provides the reverse effect. This results in a very high temperature gradient between the two zones, producing optical distortions, or even in extreme cases a physical deformation. The first face of the glass sheet is, in the usage position, located in contact with the inside of the motor vehicle.

Second Aspect of the Invention

According to a second aspect of the invention, the first coating is an enamel containing pigments, in particular black pigments. The first coating is preferably opaque. It is preferably in the form of a strip positioned at the periphery of the glass sheet. This strip preferably covers between 3% and 20% of the surface area of the glass sheet.

The enamel, in particular opaque enamel, and in particular when it is black, indeed greatly absorbs infrared radiation, more than bare glass. This results in great temperature differences between, on the one hand, the zones coated by the enamel (first zones) and, on the other hand, the zones of glass not coated by the enamel (second zones).

These differences may generate optical distortions, sometimes referred to as "burn lines", in the vicinity of the enameled zone. These distorsions are particularly troublesome when they are located close to zones, referred to as "camera zones", through which optical sensors must capture the light or images. This is the case for example for windshields equipped with sensors and/or cameras, for example rain or light sensors, or driving assistance cameras. These sensors or cameras are located inside the vehicle, for example in the zone where the rearview mirror is fastened to the windshield. An enamel coating is generally positioned in this zone in order to conceal and protect the adhesive used to fasten the rearview mirror, but this enameled zone must make a small non-enameled transmission window so that light can reach the sensors. The invention then makes it possible to reduce or even remove the optical distortions in the camera zones.

The material obtained according to this aspect of the invention is preferably a laminated glazing, in particular for a motor vehicle windshield, comprising two glass sheets adhesively bonded by means of a thermoplastic interlayer, an enamel coating being deposited on face 2 or face 4 of said glazing, in particular in the form of a peripheral strip comprising at least one non-enameled transmission window.

The enamel coating is preferably deposited by screenprinting of a fluid enamel composition comprising a glass frit, pigments and an organic medium. The latter is removed during the heat treatment step of the process, which will be, depending on the case, a pre-firing treatment or a bending treatment. After firing, the enamel coating therefore comprises pigments in a glassy matrix.

The glass frit or the glassy matrix is preferably based on a bismuth and/or zinc borosilicate. The pigments preferably comprise one or more oxides selected from the oxides of chromium, copper, iron, manganese, cobalt, nickel. They may be, by way of example, chromates of copper and/or iron. The thickness of the enamel coating, after the heat treatment step, is preferably within a range of from 5 to 50 µm, in particular from 10 to 40 µm.

Sacrificial Layer

The sacrificial layer comprises a resin. The details given below relating to the sacrificial layer apply of course to all the aspects, embodiments and variants of the invention described above.

The content of resin in the sacrificial layer is in particular at least 10% by weight, or at least 20%, or even at least 30%. It may be for example at least 50% by weight, in particular 60%, or even at least 70% or 80%, or even still 90% or 95%.

The resin may play various roles. It may in certain cases play a thermal role, its combustion during the heat treatment making it possible, via the heat released, to compensate for the differences in emissivity of the zones of the glass sheet and therefore to homogenize the heating. It may, alternatively or in addition, act as a binder by temporarily fixing to the surface of the glass sheet compounds capable of exerting this thermal compensation function, either via their combustion during the heat treatment, or by their properties of absorption or reflection, in particular of infrared radiation.

In a first embodiment, the sacrificial layer consists of resin. It is in this case the combustion of the resin during the heat treatment which will make it possible to homogenize the heat treatment.

In a second embodiment, the sacrificial layer consists of resin and of refractory or combustible mineral compounds. The resin may in this case be used to temporarily fix said compounds to the surface of the glass sheet. The term "combustible" minerals is understood to mean that these compounds are capable of burning during the heat treatment. The term "refractory" minerals is understood to mean that these compounds do not melt and do not soften during the heat treatment. In this case, the sacrificial layer is removed by combustion in so far as the resin is removed during the heat treatment, so that there is no longer an actual sacrificial layer, but the refractory mineral compounds or possible residues of the combustion of the combustible mineral compounds remain on the surface of the glass sheet, and may, if necessary, be removed by a washing and/or brushing operation.

The refractory or combustible mineral compounds are advantageously pigments (the sacrificial layer then being in particular comparable to a paint), particularly pigments that absorb at least one portion of the infrared radiation, and which will therefore increase the efficacy of the heat treatment. In the context of this embodiment, the sacrificial layer may be deposited by screenprinting of a composition consisting of an organic medium (comprising a resin and solvents) and pigments, in particular black pigments.

The mineral compounds are in particular carbon black, black pigment that absorbs infrared irradiation and which may burn during the heat treatment, optionally leaving easily removable ash.

In certain cases, the resin may be removed by a first heat treatment at a temperature of at least 550° C. leaving on the surface of the glass sheet a layer of refractory mineral compounds, the glass sheet then being subjected to a second heat treatment at a temperature of at least 550° C., then to a removal of the refractory compounds by washing and/or brushing. Such an implementation may prove necessary when the resin absolutely must be removed before the final heat treatment. For example, when the final material is a laminated glazing comprising on face 2 a first coating which is an enamel, this coating is, during the bending treatment, in contact with the outer face of the inner glass sheet of the laminated glazing. In such a configuration, it is preferable that the combustion of the resin takes place during a prior treatment for pre-firing the enamel. Then, at the moment of bending, only a layer of refractory compounds, for example pigments, remains.

Irrespective of the embodiment, various resins may be used.

The resin may in particular be chosen from acrylic resins, epoxy resins, alkyd resins, polyurethane resins, alone or as a mixture, in the aqueous or solvent phase. Copolymers of these various polymers can also be used. The resin may be in the aqueous or solvent phase, with a solids content typically of between 20% and 80%, in particular between 30% and 70% by weight.

The resin may be a UV-crosslinkable resin, in particular based on (meth)acrylates and optionally on a photoinitiator; a solvent-free resin, or optionally a resin in the aqueous or solvent phase. The resin may not be crosslinked if the glass sheet does not need to be handled between the application of the sacrificial layer and the heat treatment. Otherwise, it is preferable to provide a UV-drying step.

The resin may be a latex, i.e. in the form of an aqueous dispersion or emulsion. The drying may take place in air or a furnace, but the drying step may be omitted if the glass sheet does not need to be handled between the application of the sacrificial layer and the heat treatment.

The resin may be a thermoplastic resin, for example a hot-melt resin or a thermoplastic elastomer, for example an SEBS (polystyrene-b-poly(ethylene-butylene)-b-polystyrene) copolymer.

The resin may be the resin of an organic medium for an enamel composition.

The sacrificial layer is preferably deposited by screenprinting, digital printing, roller coating, curtain coating or spray coating.

The sacrificial layer is deposited on at least one portion of the second zone. It may be deposited on the whole of the second zone or on each second zone, or even on the whole of the first face. If the sacrificial layer is not incompatible with certain zones, the latter embodiment is preferable from an industrial point of view since it enables a full-face deposition by curtain coating or roller coating techniques. Otherwise, these techniques require prior masking of the zones not to be covered. The processes of screenprinting, digital printing, or else pad printing, themselves make it possible to deposit the sacrificial layer only on given zones. These techniques of localized deposition may be useful for example when the objective of the invention is to prevent the optical distortions in a camera zone since in this case only a small zone of the glass sheet is affected by the process according to the invention.

The thickness of the sacrificial layer is preferably between 100 nm and 80 µm, in particular between 1 µm and 30 µm, or even between 5 µm and 20 µm.

The heat treatment makes it possible to remove the sacrificial layer by combustion. As indicated above, the resin of the sacrificial layer is removed during this step, but refractory compounds may remain at the surface of the glass sheet and may then be removed by washing and/or brushing, optionally after a second heat treatment.

The heat treatment is in particular a treatment for bending and/or tempering the glass sheet. The heat treatment uses temperatures preferably between 600° C. and 750° C., in particular between 620° C. and 700° C. The thermal tempering treatment further includes a forced and rapid cooling of the surface of the glass, for example using air nozzles, so as to create surface compressive stresses which improve the mechanical strength of the glass sheet.

When one of the coatings is an enamel or is based on silver paste, the firing of the enamel or of the silver paste preferably takes place during this heat treatment.

When one of the coatings is an enamel, the heat treatment, during which the resin is removed by combustion, may also be a treatment for pre-firing said enamel. The heat treatment then uses temperatures preferably between 550° C. and 650° C., in particular between 560° C. and 600° C. The pre-firing treatment is in particular useful for developing the non-stick properties of certain enamels. In this case, the heat treatment is preferably followed by a treatment for bending the glass sheet. As indicated above, this embodiment is particularly valuable when the first coating is an enamel intended to be on face 2 of a laminated glazing, said enamel being in contact with the other glass sheet of the laminated glazing during the bending treatment. In such a case, the sacrificial layer advantageously comprises a resin and refractory pigments, the resin being removed during the treatment for pre-firing the enamel and leaving a layer of pigments, which is then removed by washing and/or brushing after the bending treatment and before lamination.

The process may comprise, after the heat treatment step, a step of washing and/or brushing. This step makes it possible to remove possible organic residues resulting from the combustion of the sacrificial layer, or even possible mineral residues when the sacrificial layer contained them (for example pigments).

The process may further comprise, after the heat treatment step, a lamination step, wherein the glass sheet is bonded to another glass sheet by a thermoplastic interlayer.

The material obtained may be a glazing for buildings or transport vehicles, in particular motor vehicles. In the latter case, the glazing is preferably a motor vehicle roof, a motor vehicle roof panel, a motor vehicle rear window or a motor vehicle windshield.

The motor vehicle roof or roof panel preferably comprises a glass sheet coated with an enamel (in particular black enamel) positioned at the periphery of the first face of the glass sheet, and deposited on an electrically conductive coating comprising a transparent conductive oxide and positioned over the whole of said first face. The first face is intended to be in contact with the interior atmosphere of the vehicle whereas the opposite face, or second face, is preferably adhesively bonded, via a thermoplastic interlayer to another glass sheet. One and/or the other of the glass sheets and/or the thermoplastic interlayer are preferably tinted so that the light transmission of the glazing is at most 40%, in particular 30%. The glass sheets are preferably curved.

The motor vehicle rear window preferably comprises a single curved and tempered glass sheet comprising, on the face intended to be in contact with the interior of the vehicle, as first coating, silver paste tracks comprising heating wires that pass through the glass sheet and bus bars located on two opposite sides of the glass sheet, the bus bars being deposited on an enamel coating (in particular black enamel coating) positioned at the periphery of the glass sheet. The presence of enamel makes it possible in particular to conceal the bus bars from the outside of the vehicle.

The motor vehicle windshield preferably comprises a curved laminated glazing comprising two glass sheets adhesively bonded by means of a thermoplastic interlayer, an enamel coating (in particular black enamel coating) being positioned at the periphery of one of the glass sheets, in particular on face 2 or on face 4 of the glazing. According to the convention used, face 2 is the inner face of the glass sheet intended to be located outside the vehicle, which face is therefore in contact with the interlayer, and face 4 is the inner face of the glass sheet intended to be located inside the vehicle. The peripheral enamel makes it possible to conceal and protect the seals and adhesives enabling the attachment of the glazing to the bodywork opening or of the rearview mirror to the glazing. Preferably, the windshield comprises at least one sensor and the peripheral enamel strip comprises a non-enameled transmission window opposite said sensor.

EXAMPLES

The following examples illustrate the invention in a nonlimiting manner.

Example 1

A glass sheet was coated by screenprinting, firstly over the whole of its first face with a black enamel coating, then over half of this enamel coating with a coating based on silver paste. The coated face of the glass sheet therefore comprised two zones, a first zone (coated only with enamel) having a higher emissivity than that of a second zone (coated both with the enamel and with the silver paste).

The glass sheet thus coated was then heat treated by being placed for a period of 180 seconds in a furnace heated to a temperature of 680° C. The change in the temperature of the glass (measured on the face opposite the first face) in the first zone (T1) and in the second zone (T2) was measured.

In tests 1A and 1B, a sacrificial layer was deposited over the whole of the first and second zones. For test 1A the sacrificial layer was a layer of a UV-crosslinking resin based on acrylates, having a thickness of around 10 µm whereas for test 1B the sacrificial layer was a layer of paint comprising around 50%, as solids, of an epoxy acrylate resin and carbon black, having a thickness after drying of around 5 µm. In a (comparative) test 1C, no sacrificial layer was deposited.

FIG. 1 presents the temperature difference T1–T2 as a function of the heating time (t, expressed in seconds).

The results show that the sacrificial layer makes it possible to greatly reduce the temperature difference, which is at most 10° C. as an absolute value, whereas this difference may range up to 80° C. in the absence of a sacrificial layer.

Example 2

A glass sheet was coated over the whole of its first face, by sputtering, with a low-emissivity coating based on TCO, comprising a layer of mixed indium tin oxide (ITO) flanked by thin layers of silicon oxide and nitride. Half of this low-emissivity coating was then coated by screenprinting with a black enamel coating.

The coated face of the glass sheet therefore comprised two zones, a first zone (coated with enamel) having a higher emissivity than that of the second zone (coated only with the low-emissivity coating).

The glass sheet thus coated was then heat treated by being placed for a period of 180 seconds in a furnace heated to a temperature of 680° C. The change in the temperature of the glass (measured on the face opposite the first face) in the first zone (T1) and in the second zone (T2) was measured.

In tests 2A and 2B, a sacrificial layer (respectively identical to the one used for tests 1A and 1B) was deposited over the whole of the first and second zones. In a (comparative) test 2C, no sacrificial layer was deposited.

Figure 2:
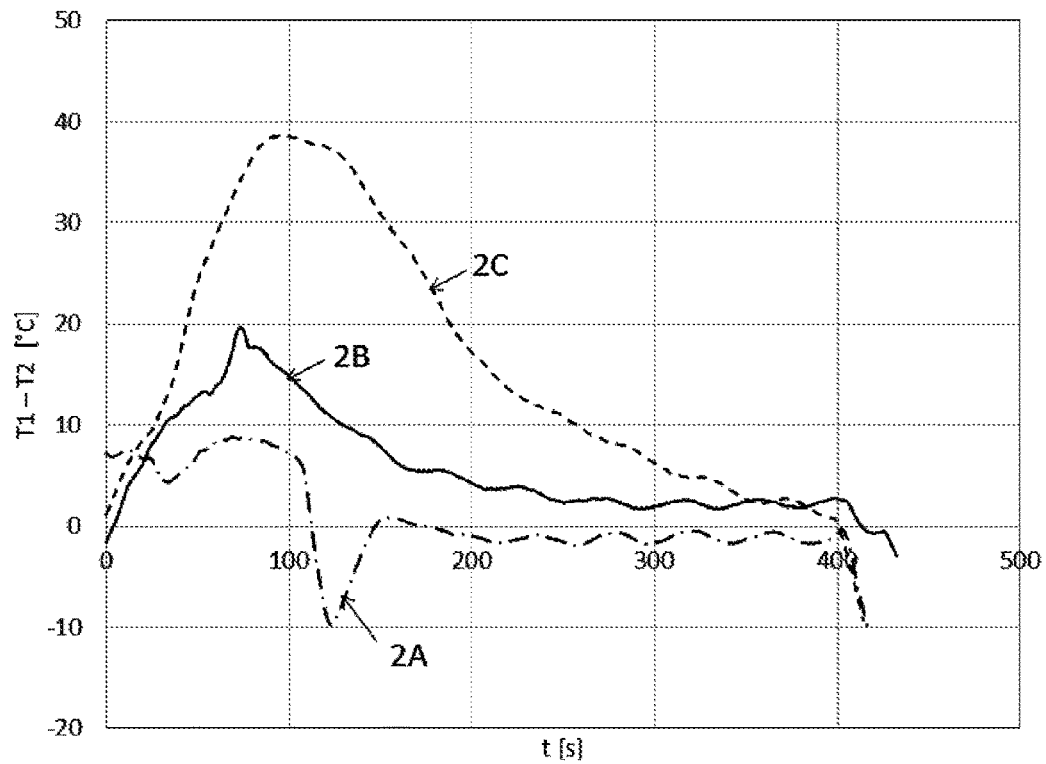
FIG. 2 shows a graph that represents variations of the temperature difference T1-T2 as a function of the heating time (t, expressed in seconds) between a first zone having a higher emissivity than that of a second zone of different glass substrates according to an embodiment.

FIG. 2 presents the temperature difference T1–T2 as a function of the heating time (t, expressed in seconds).

The results show that the sacrificial layer makes it possible to greatly reduce the temperature difference, which is at most 20° C. as an absolute value, whereas this difference may range up to 40° C. in the absence of a sacrificial layer.

Example 3

A glass sheet was coated by screenprinting, firstly over the whole of its first face with a black enamel coating, then over half of this enamel coating with a coating based on silver paste. The coated face of the glass sheet therefore comprised two zones, a first zone (coated only with enamel) having a higher emissivity than that of a second zone (coated both with the enamel and with the silver paste).

The glass sheet thus coated was then heat treated by being placed for a period of 180 seconds in a furnace heated to a temperature of 710° C. The change in the temperature of the glass (measured on the face opposite the first face) in the first zone (T1) and in the second zone (T2) was measured.

In a test 3A, a sacrificial layer was deposited by screenprinting on the second zone.

The screenprinted composition consisted of an organic medium and of black mineral pigments based on oxides of copper (37% by weight), of iron (17% by weight) and of manganese (46% by weight). The wet thickness was 15 µm. In this example, the heat treatment made it possible to remove the sacrificial layer by combustion of the resin, leaving the pigments on the surface of the glass.

In a (comparative) test 3B, no sacrificial layer was deposited.

Figure 3:
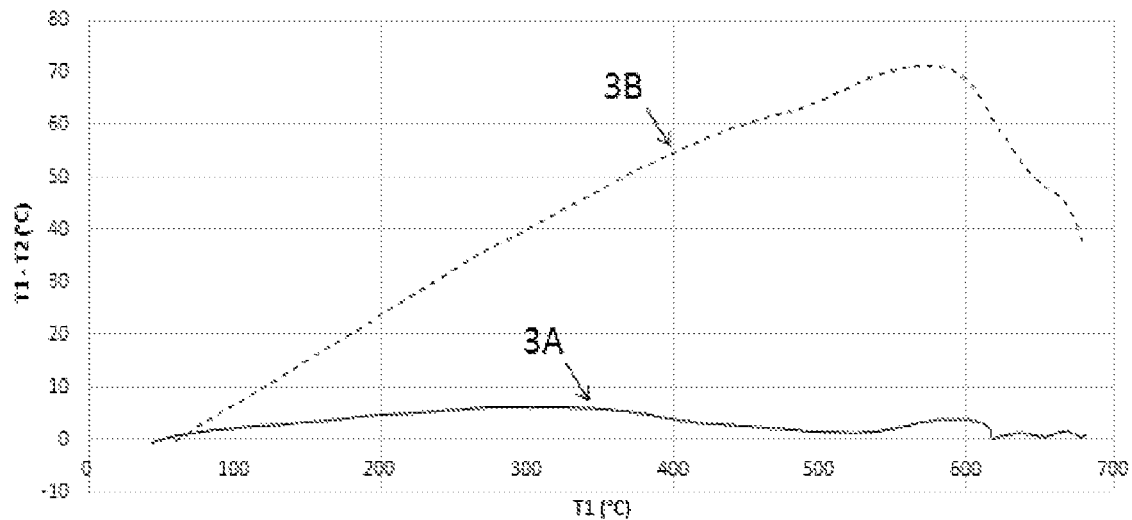
FIG. 3 shows a graph that represents variations of the temperature difference T1-T2 as a function of temperature T1 according to an embodiment.

FIG. 3 presents the temperature difference T1–T2 as a function of the temperature T1.

The results show that the sacrificial layer makes it possible to greatly reduce the temperature difference, which is at most 6° C. as an absolute value in the case of example 3A, whereas this difference may range up to more than 70° C. in the absence of a sacrificial layer.

Example 4

A glass sheet was coated by screenprinting, over a portion of its first face with a black enamel coating. The coated face of the glass sheet therefore comprised two zones, a first zone (coated with enamel) having a higher emissivity than that of a second (uncoated, therefore bare glass) zone.

Next, another uncoated clear glass sheet was positioned on the glass sheet thus coated in order to simulate the bending conditions with a view to the manufacture of a laminated windshield. The assembly was then heat-treated by being placed for a period of 180 seconds in a furnace heated to a temperature of 710° C. The change in the temperature of the glass in the first zone (T1) and in the second zone (T2) was measured using thermocouples placed between the two glass sheets.

In test 4A the zone not coated by the enamel (second zone) was previously coated by screenprinting with a composition consisting of an organic medium and black pigments, the composition being identical to that used in the context of example 3.

In the (comparative) test 4B, no sacrificial layer was deposited.

Figure 4:
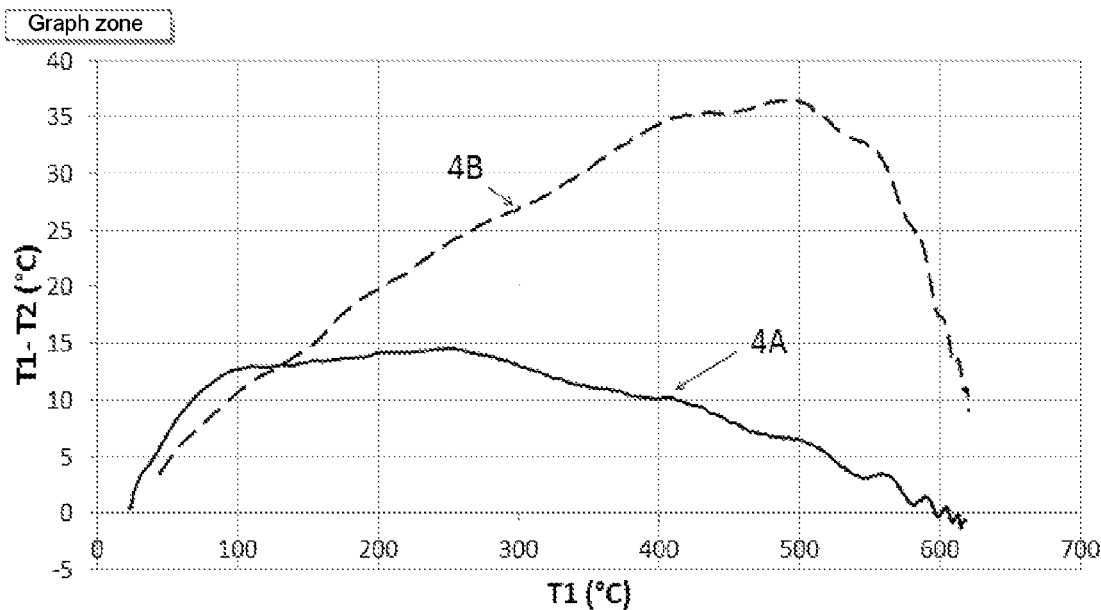
FIG. 4 shows a graph that represents variations of the temperature difference T1-T2 as a function of temperature T1 according to an embodiment.

FIG. 4 presents the temperature difference T1–T2 as a function of T1.

The results show that the sacrificial layer makes it possible to greatly reduce the temperature difference at high temperature, since it is at most 15° C. as an absolute value in the case of example 4A, whereas this difference may range up to more than 35° C. in the absence of a sacrificial layer. When the temperature of the enamel reaches 500° C., the temperature difference is less than 5° C. in the case of example 4A versus 35° C. for the comparative example 4B.

Example 5

In a comparative test 5A a layer of black enamel (wet thickness of around 20 μm) having at its center an uncoated 150×130 mm² camera zone was deposited by screenprinting on a first glass sheet having a thickness of 2.1 mm. After drying at 150° C. for 2 minutes, the enamel was pre-fired at 600° C. for 115 seconds, then the first glass sheet was coupled with a second glass sheet having a thickness of 2.1 mm so that the enameled face is on the side of the second glass sheet, the two glass sheets being held at a distance by positioning between them an interlayer powder providing a space of a few tens of micrometers, typically from 20 to 50 μm. The assembly was then subjected to a bending treatment at 610° C. for 340 seconds, then the two glass sheets were separated, washed in order to remove the interlayer powder, and finally laminated by means of a polyvinyl butyral (PVB) sheet. In the laminated glazing obtained, the enamel layer was therefore on face 2.

In the test according to the invention 5B, a sacrificial layer was deposited both on the black enamel layer and on the camera zone, before the pre-firing treatment. To do this, a composition consisting of an organic medium and black pigments, identical to the one used in examples 3 and 4, was deposited by screenprinting after drying the black enamel. The layer, having a wet thickness of the order of 6 to 8 μm, was dried at 150° C. for 2 minutes. The pre-firing treatment makes it possible to remove the sacrificial layer by combustion of the organic medium, leaving a layer of black pigments on the glass sheet.

The optical distortion in the camera zone was then measured using a Labscan machine sold by ISRA Vision with 1/2/0 filtering. The maximum horizontal distortion in the camera zone that was measured was 584 millidiopters in the case of comparative example 5A and 160 millidiopters in the case of example 5B.

The presence of a sacrificial layer during the pre-firing and bending therefore made it possible to substantially reduce the distortion in the camera zone.

The invention claimed is:

1. A process for obtaining a material comprising a glass sheet, said process comprising:
   providing a glass sheet comprising a first face coated at least partly by an essentially mineral first coating, said first face having at least one first zone and at least one second zone, said at least one first zone having a higher emissivity than that of said second zone, then
   applying, on at least one portion of said second zone, a sacrificial layer comprising a resin, then
   heat treating said coated glass sheet by positioning said coated glass sheet in a furnace at a temperature of at least 550° C., during which step said sacrificial layer is removed in said furnace by combustion, wherein said sacrificial layer is applied on said at least one portion of said second zone such that during an entire duration of said heat treating of the coated glass sheet in said furnace a difference of temperature between the at least one first zone and said at least one portion of said second zone that is covered by the sacrificial layer is at most 20° C. as an absolute value.

2. The process as claimed in claim 1, wherein the first coating is electrically conductive.

3. The process as claimed in claim 2, wherein the first coating comprises at least one metal or comprises at least one transparent conductive oxide.

4. The process as claimed in claim 3, wherein the at least one metal is silver.

5. The process as claimed in claim 1, wherein the first face is coated over at least one portion by an essentially mineral second coating.

6. The process as claimed in claim 5, wherein one of the first and second coatings partially covers the other.

7. The process as claimed in claim 6, wherein the first coating is electrically conductive and covers a portion of the second coating which is an enamel containing pigments.

8. The process as claimed in claim 7, wherein the first coating comprises silver paste tracks.

9. The process as claimed in claim 6, wherein the second coating is an enamel containing pigments and partially covers the first coating which is electrically conductive.

10. The process as claimed in claim 1, wherein the first coating is an enamel containing pigments, in particular black pigments.

11. The process as claimed in claim 5, wherein the second coating is an enamel containing pigments.

12. The process as claimed in claim 11, wherein the heat treatment is a treatment for pre-firing the enamel.

13. The process as claimed in claim 12, wherein the treatment for pre-firing the enamel is followed by a treatment for bending the glass sheet.

14. The process as claimed in claim 11, wherein the enamel containing pigments includes black pigments.

15. The process as claimed in claim 1, wherein the sacrificial layer consists of resin and of refractory or combustible mineral compounds.

16. The process as claimed in claim 15, wherein the sacrificial layer consists of resin and of pigments.

17. The process as claimed in claim 1, wherein the heat treatment is a treatment for bending and/or tempering the glass sheet.

18. The process as claimed in claim 1, further comprising, after the heat treatment step, a lamination step, wherein the glass sheet is bonded to another glass sheet by a thermoplastic interlayer.

* * * * *